US012810419B2

(12) United States Patent
Shimamura et al.

(10) Patent No.: US 12,810,419 B2

(45) Date of Patent: Nov. 24, 2026

(54) IMAGE ANALYSIS APPARATUS, IMAGE ANALYSIS SYSTEM, IMAGE ANALYSIS METHOD, AND RECORDING MEDIUM

(71) Applicant: Konica Minolta, Inc., Tokyo (JP)

(72) Inventors: Kenta Shimamura, Hino (JP); Akinori Tsunomori, Kodaira (JP); Haruhiko Miyazaki, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 182 days.

(21) Appl. No.: 18/603,849

(22) Filed: Mar. 13, 2024

(65) Prior Publication Data

US 2024/0320825 A1 Sep. 26, 2024

(30) Foreign Application Priority Data

Mar. 23, 2023 (JP) ................................ 2023-046702

(51) Int. Cl.

| | |
|---|---|
| ***G06T 7/00*** | (2017.01) |
| ***G06T 7/11*** | (2017.01) |
| ***G06T 7/62*** | (2017.01) |
| ***G06T 11/26*** | (2026.01) |
| ***G06V 10/25*** | (2022.01) |

(52) U.S. Cl.

CPC .............. *G06T 7/0012* (2013.01); *G06T 7/11* (2017.01); *G06T 7/62* (2017.01); *G06T 11/26* (2026.01); *G06V 10/25* (2022.01); *G06T 2207/10124* (2013.01); *G06T 2207/30061* (2013.01)

(58) Field of Classification Search

CPC . G06T 7/0012; G06T 7/11; G06T 7/62; G06T 11/26; G06T 2207/10124; G06T 2207/30061; G06T 7/0016; G06V 10/25

USPC .......................................................... 382/128

See application file for complete search history.

(56) References Cited

U.S. PATENT DOCUMENTS

| | | | | |
|---|---|---|---|---|
| 10,368,800 | B2 * | 8/2019 | Qiu | A61B 5/4818 |
| 2005/0105788 | A1 * | 5/2005 | Turek | G06T 7/0012 382/131 |
| 2015/0290418 | A1 * | 10/2015 | Kaczka | A61M 16/18 128/200.14 |
| 2016/0287307 | A1 * | 10/2016 | Clark | A61B 5/0036 |

(Continued)

FOREIGN PATENT DOCUMENTS

| | | |
|---|---|---|
| JP | 2015-226710 A | 12/2015 |
| JP | 2020-168176 A | 10/2020 |

OTHER PUBLICATIONS

Notice of Reasons for Refusal, dated Oct. 6, 2026, which was issued for the corresponding Japan Patent Application No. 2023-046702, 9 pages, with English translation.

(Continued)

*Primary Examiner* — Ali Bayat

(74) *Attorney, Agent, or Firm* — LUCAS & MERCANTI, LLP

(57) ABSTRACT

An image analysis apparatus includes a hardware processor that: receives a dynamic image that includes a plurality of frame images taken by dynamically radiographing an expiratory state of a subject including a trachea; sets an inside of a chest cavity in each of the plurality of frame images, as an intrathoracic region; extracts tracheal walls from the plurality of frame images; and gauges a tracheal diameter from the tracheal walls in the intrathoracic region.

16 Claims, 11 Drawing Sheets

(56) References Cited

U.S. PATENT DOCUMENTS

| | | | | |
|---|---|---|---|---|
| 2018/0272089 | A1* | 9/2018 | Maracaja | A61B 1/126 |
| 2018/0289515 | A1* | 10/2018 | Nemes | A61F 2/88 |
| 2022/0202274 | A1* | 6/2022 | Hwang | A61B 1/0005 |
| 2025/0029260 | A1* | 1/2025 | Udupa | G06V 10/25 |

OTHER PUBLICATIONS

Watase, S. et al. “Evaluation of intrathoracic tracheal narrowing in patients with obstructive ventilatory impairment using dynamic chest radiography: A preliminary study”, European Journal of Radiology, 2020, vol. 129, No. 109141, pp. 1-6.

Sonoda, A., “Clinical Usefulness of Tracheal Diameter Evaluation Using Dynamic X-ray Radiography” [online], Innavi Net, 2020, <https://www.innervision.co.jp/ sp/ad/suite/konicaminolta/xray_seminarreport/201911seminar05>, with concise explanation of relevance in English.

* cited by examiner

IMAGE ANALYSIS APPARATUS, IMAGE ANALYSIS SYSTEM, IMAGE ANALYSIS METHOD, AND RECORDING MEDIUM

REFERENCE TO RELATED APPLICATIONS

The entire disclosure of Japanese Patent Application No. 2023-046702, filed on Mar. 23, 2023, including description, claims, drawings and abstract is incorporated herein by reference in its entirety.

BACKGROUND OF THE INVENTION

Technical Field

The present invention relates to an image analysis apparatus, an image analysis system, an image analysis method, and a recording medium.

Description of Related Art

Tracheobronchomalacia has been known as a disorder where the trachea and bronchi are soft and shrunk, causing the respiratory tract to stenose (constrict) at the time of exhalation. For an image analysis apparatus to determine whether the trachea and bronchi are stenosed or not from images, a tracheal region is required to be identified from the images.

Accordingly, for example, JP 2015-226710A describes a medical image processing apparatus that identifies a tracheal region by detecting the vocal cord position, and the branching positions of the tree structure of bronchi.

SUMMARY OF THE INVENTION

However, the invention of JP 2015-226710A also identifies an extrathoracic region where no stenosis occurs in tracheobronchomalacia, as a tracheal region. Accordingly, there is a possibility that when it is determined whether the trachea and the bronchi are stenosed or not, the accuracy is reduced.

The present invention has an object to provide an image analysis apparatus, an image analysis system, an image analysis method, and a recording medium that can highly accurately estimate the stenosed states of the trachea and bronchi.

To achieve at least one of the abovementioned objects, according to an aspect of the present invention, an image analysis apparatus reflecting one aspect of the present invention includes a hardware processor that:

receives a dynamic image that includes a plurality of frame images taken by dynamically radiographing an expiratory state of a subject including a trachea;

sets an inside of a chest cavity in each of the plurality of frame images, as an intrathoracic region;

extracts tracheal walls from the plurality of frame images; and gauges a tracheal diameter from the tracheal walls in the intrathoracic region.

To achieve at least one of the abovementioned objects, according to an aspect of the present invention, an image analysis method reflecting one aspect of the present invention is an image analysis method of an image analysis apparatus, the method including:

receiving a dynamic image that includes a plurality of frame images taken by dynamically radiographing an expiratory state of a subject including a trachea;

setting an inside of a chest cavity in each of the plurality of frame images, as an intrathoracic region;

extracting tracheal walls from the plurality of frame images; and gauging a tracheal diameter from the tracheal walls in the intrathoracic region.

To achieve at least one of the abovementioned objects, according to an aspect of the present invention, a recording medium reflecting one aspect of the present invention stores:

a program for causing a computer of an image analysis apparatus to:

receive a dynamic image that includes a plurality of frame images taken by dynamically radiographing an expiratory state of a subject including a trachea;

set an inside of a chest cavity in each of the plurality of frame images, as an intrathoracic region;

extract tracheal walls from the plurality of frame images; and gauge a tracheal diameter from the tracheal walls in the intrathoracic region.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

[Image Analysis System]

Figure 1:
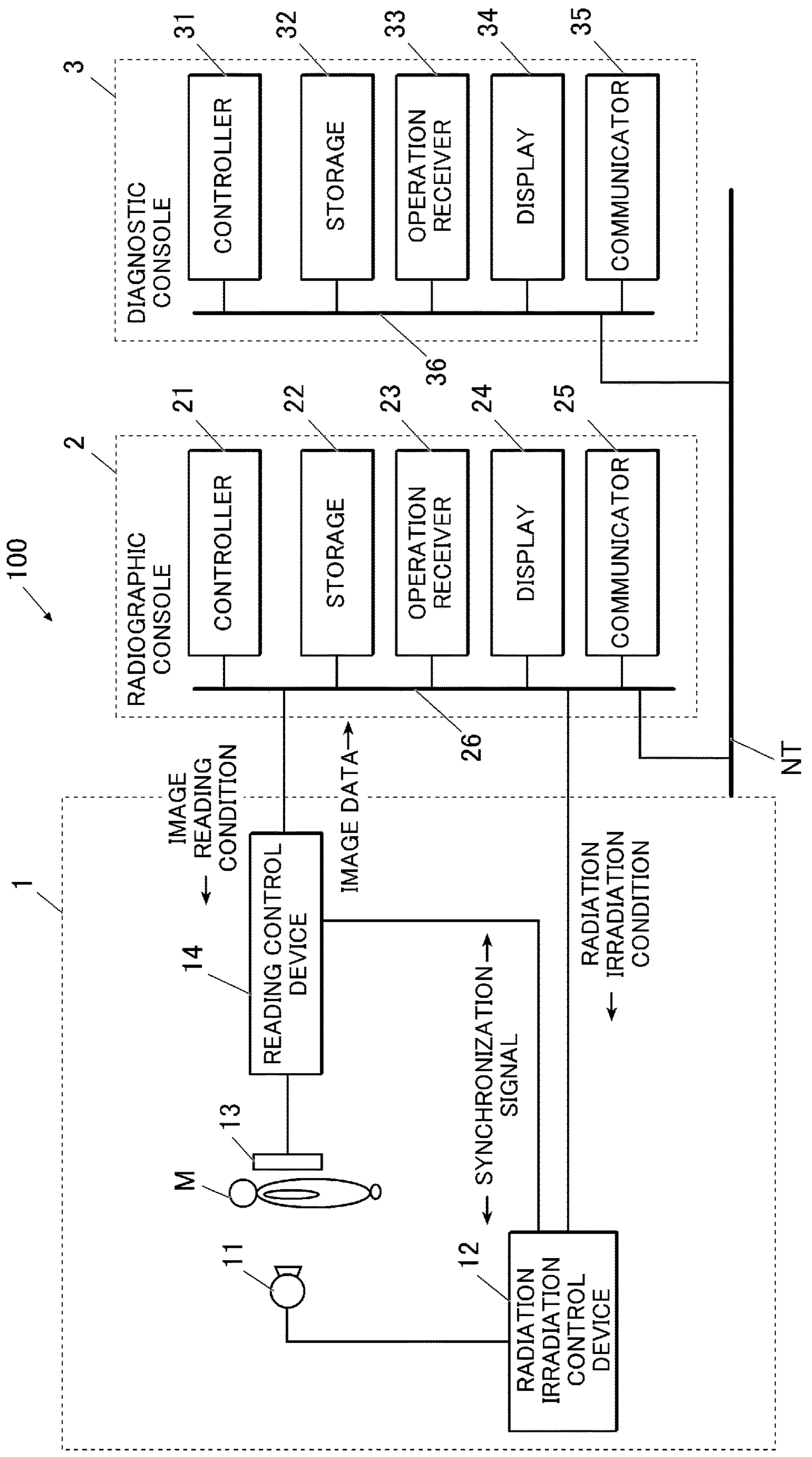
FIG. 1 shows an entire configuration of an image analysis system.

FIG. 1 shows the entire configuration of an image analysis system 100 that includes a diagnostic console 3 that is an image analysis apparatus according to this embodiment.

As shown in FIG. 1, in the image analysis system 100, a radiographing apparatus 1, and a radiographic console 2 are connected to each other by a communication cable or the like. The radiographic console 2 and the diagnostic console 3 are connected to each other by a communication network NT, such as a local area network (LAN). The apparatuses constituting the image analysis system 100 conform to the Digital Image and Communications in Medicine (DICOM) Standard. Accordingly, communication between the apparatuses conforms to the DICOM.

[Radiographing Apparatus]

The radiographing apparatus 1 is, for example, a radiographic device for radiographing the dynamics of a subject M. The radiographing apparatus 1 performs pulse irradiation that causes radiation, such as X-rays, to be pulsed radiation, and repeatedly irradiates the subject M with the radiation at predetermined intervals. Alternatively, the radiographing apparatus 1 seamlessly and continuously performs continuous irradiation at a low dose rate. In dynamic radiography by such pulse irradiation or continuous irradiation, the radiographing apparatus 1 obtains a plurality of images that indicate the dynamics of the subject M. Here, a series of images obtained by dynamic radiography is called a dynamic image. Each of the images constituting the dynamic image is called a frame image. Here, the dynamic radiography includes moving image radiography, but does not include radiography of a still image with a moving image being displayed. The dynamic image includes a moving image, but does not include an image obtained by radiographing a still image with a moving image being displayed.

Note that in the following embodiment, an example of a case where the radiographing apparatus 1 dynamically radiographs a chest by pulse irradiation is described.

(Radiation Source)

A radiation source 11 is arranged at a position so as to face a radiation detector 13, with the subject M intervening therebetween. The radiation source 11 irradiates the subject M with radiation (X-rays) according to control by a radiation irradiation control device 12.

(Radiation Irradiation Control Device)

The radiation irradiation control device 12 is connected to the radiographic console 2. The radiation irradiation control device 12 controls the radiation source 11 to perform radiography, based on a radiation irradiation condition input through the radiographic console 2. The radiation irradiation condition includes, for example, the pulse rate, the pulse width, the pulse interval, the number of radiographic frames per radiographing action, the value of X-ray tube current, the value of X-ray tube voltage, and an added filter type. The pulse rate is the number of irradiations with radiation per second, and coincides with the frame rate described later. The pulse width is a time period of irradiation with radiation per radiation irradiation. The pulse interval is a time period from the start of one irradiation with radiation to the start of the next irradiation with radiation, and coincides with the frame interval described later.

(Radiation Detector)

The radiation detector 13 is provided so as to face the radiation source 11, with the subject M being intervening therebetween. The radiation detector 13 includes a semiconductor image sensor, such as a flat panel display (FPD). The FPD includes, for example, a glass substrate or the like. A plurality of detection elements (pixels) are arranged in a matrix manner, at a predetermined position on the substrate of the FPD. The detection elements are irradiated by the radiation source 11, and detects radiation having at least transmitted through the subject M, in accordance with its intensity. The detection elements convert the detected radiation into electrical signals, and accumulate electrical charges. Each pixel includes, for example, a switcher, such as a thin film transistor (TFT). FPDs include, for example, an indirect conversion type that converts X-rays into an electrical signal by each photoelectric conversion element via a scintillator. FPDs also include a direct conversion type that directly converts X-rays into an electric signal. In this embodiment, the radiation detector 13 may adopt an indirect conversion type FPD, or a direct conversion type FPD.

(Reading Control Device)

A reading control device 14 is connected to the radiographic console 2. The reading control device 14 controls the switcher of each pixel of the radiation detector 13. This control is based on an image reading condition input through the radiographic console 2.

The reading control device 14 switches reading of the electric signals accumulated in each pixel, and reads the electric signals accumulated in the radiation detector 13, thus obtaining image data. The image data is a frame image. Each frame image includes a signal value representing the density of each pixel. The reading control device 14 then outputs the obtained frame image to the radiographic console 2.

The image reading condition includes, for example, the frame rate, the frame interval, the pixel size, and the image size (matrix size). The frame rate is the number of frame images obtained per second, and coincides with the pulse rate. The frame interval is a time period from the start of one operation of obtaining the frame image to the start of an operation of obtaining the next frame image, and coincides with the pulse interval.

The radiation irradiation control device 12 and the reading control device 14 are connected to each other. The radiation irradiation control device 12 and the reading control device 14 exchange synchronization signals between each other, and synchronize a radiation irradiation operation with an image reading operation.

[Radiographic Console]

The radiographic console 2 outputs a radiation irradiation condition, and an image reading condition to the radiographing apparatus 1. The radiographic console 2 controls radiographing by the radiographing apparatus 1, and reading of a radiograph. The radiographic console 2 displays the dynamic image obtained by the radiographing apparatus 1. Accordingly, a radiography operator, such as a radiography technologist, can verify positioning. Furthermore, the radiography operator, such as the radiography technologist, can verify whether the image is suitable for diagnosis.

As shown in FIG. 1, the radiographic console 2 includes a controller 21, a storage 22, an operation receiver 23, a display 24, and a communicator 25. The components of the radiographic console 2 are connected to each other via a bus 26.

(Controller)

The controller 21 includes a central processing unit (CPU), and a random access memory (RAM), or the like. The CPU of the controller 21 reads a system program and various processing programs stored in the storage 22, in response to an operation through the operation receiver 23, and loads the programs into the RAM. The CPU of the controller 21 executes various processes including the aftermentioned radiographing control process, according to the loaded programs. The CPU of the controller 21 centrally controls the operation of each component of the radiographic console 2, the radiation irradiation operation, and a reading operation of the radiographing apparatus 1.

(Storage)

The storage 22 includes a nonvolatile semiconductor memory, a hard disk, or the like. The storage 22 stores various programs to be executed by the controller 21, and parameters required to execute the processes by the various programs, or data, such as processing results. For example, the storage 22 stores a program for executing the radiographing control process shown in FIG. 2. The storage 22 stores the radiation irradiation condition and the image reading condition, in association with the test target site and the radiographic direction. The various programs are stored in a form of computer-readable program code. The controller 21 sequentially executes operations according to the program code.

(Operation Receiver)

The operation receiver 23 includes: a keyboard that includes cursor keys, numerical input keys, and various function keys, or the like; and a pointing device, such as a mouse. The operation receiver 23 outputs, to the controller 21, an instruction signal input by a key operation to the keyboard or a mouse operation. The operation receiver 23 may include a touch panel on a display screen of the display 24. In this case, the operation receiver 23 outputs, to the controller 21, the instruction signal input through the touch panel.

(Display)

The display 24 includes a monitor, such as a liquid crystal display (LCD) or a cathode ray tube (CRT). The display 24 displays an input instruction, data and the like from the operation receiver 23, according to an instruction of a display signal input from the controller 21.

(Communicator)

The communicator 25 includes an LAN adapter, a modem, or a terminal adapter (TA), and the like. The communicator 25 controls data transmission and reception to and from each apparatus connected to the communication network NT.

[Diagnostic Console]

As shown in FIG. 1, the diagnostic console 3 is an apparatus that includes a controller 31 (a hardware processor), a storage 32, an operation receiver 33, a display 34, and a communicator 35, or the like. The components of the diagnostic console 3 are connected to each other via a bus 36. The diagnostic console 3 obtains the dynamic image from the radiographic console 2. The diagnostic console 3 measures feature quantities representing stenosed states of a trachea and/or bronchi (hereinafter, represented as trachea and bronchi), based on the obtained dynamic image. The diagnostic console 3 estimates the stenosed states of the trachea and bronchi, based on a measurement result of the feature quantities.

(Controller)

The controller 31 includes a CPU, and a RAM, or the like. The CPU of the controller 31 reads a system program and various processing programs stored in the storage 32, in response to an operation through the operation receiver 33, and loads the programs into the RAM. The CPU of the controller 31 executes various processes including an aftermentioned stenosed state estimation process according to the loaded programs, and centrally controls the operation of each component of the diagnostic console 3.

As described later, in the present invention, the controller 31 functions as a receiver that receives the dynamic image. The controller 31 also functions as a setter that sets the inside of a chest cavity as an intrathoracic region R1 (see FIG. 6) in each of multiple frame images. The controller 31 further functions as an extractor that extracts tracheal walls W (see FIG. 8B) from each of the frame images. The controller 31 further functions as a gauge that gauges the tracheal diameter r (see FIG. 10C) from the tracheal walls W in the intrathoracic region R1. The controller 31 further functions as a display controller that causes the display 34 to display a gauging result of the gauge. The controller 31 further functions as an identification device that identifies the expiratory state of the subject M. The controller 31 further functions as an adjuster that adjusts the extracted tracheal walls W. The controller 31 further functions as a measurement instrument that measures the temporal change in density in the intrathoracic tracheal region R2 (see FIG. 6).

(Storage)

The storage 32 includes a nonvolatile semiconductor memory, a hard disk, or the like. The storage 32 stores various programs, and parameters required for execution of the processes by the programs, or data, such as a processing result. The various programs include a program for allowing the controller 31 to execute the stenosed state estimation process shown in FIG. 3. These various programs are stored in the storage 32 in a form of computer-readable program code. The controller 31 sequentially executes operations according to the program code.

The storage 32 stores various types of information in association with patient information and test information. The various types of information include, for example, previously radiographed dynamic images, and after-mentioned stenosis rates and presence or absence of a stenosis of the trachea and bronchi measured from the dynamic image, and an estimated result of a disorder. Note that the patient information includes, for example, a patient ID, a patient name, a height, a weight, an age, and a gender of the patient. The test information includes, for example, a test ID, a test date, a test target site, and a radiographic direction, such as front or side.

(Operation Receiver)

The operation receiver 33 includes: a keyboard that includes cursor keys, numerical input keys, and various function keys, or the like; and a pointing device, such as a mouse, and the like. The operation receiver 33 outputs, to the controller 31, an instruction signal input by a key operation or a mouse operation. The operation receiver 33 may include a touch panel on a display screen of the display 34. In this case, the operation receiver 33 outputs, to the controller 31, the instruction signal input through the touch panel.

(Display)

The display 34 includes a monitor, such as an LCD or a CRT. The display 34 displays various indications according to an instruction of a display signal input from the controller 31.

(Communicator)

The communicator 35 includes an LAN adapter, a modem, a TA, or the like. The communicator 35 controls data transmission and reception to and from each apparatus connected to the communication network NT.

[Operation of Image Analysis System]

[Radiographing Control Process]

Figure 2:
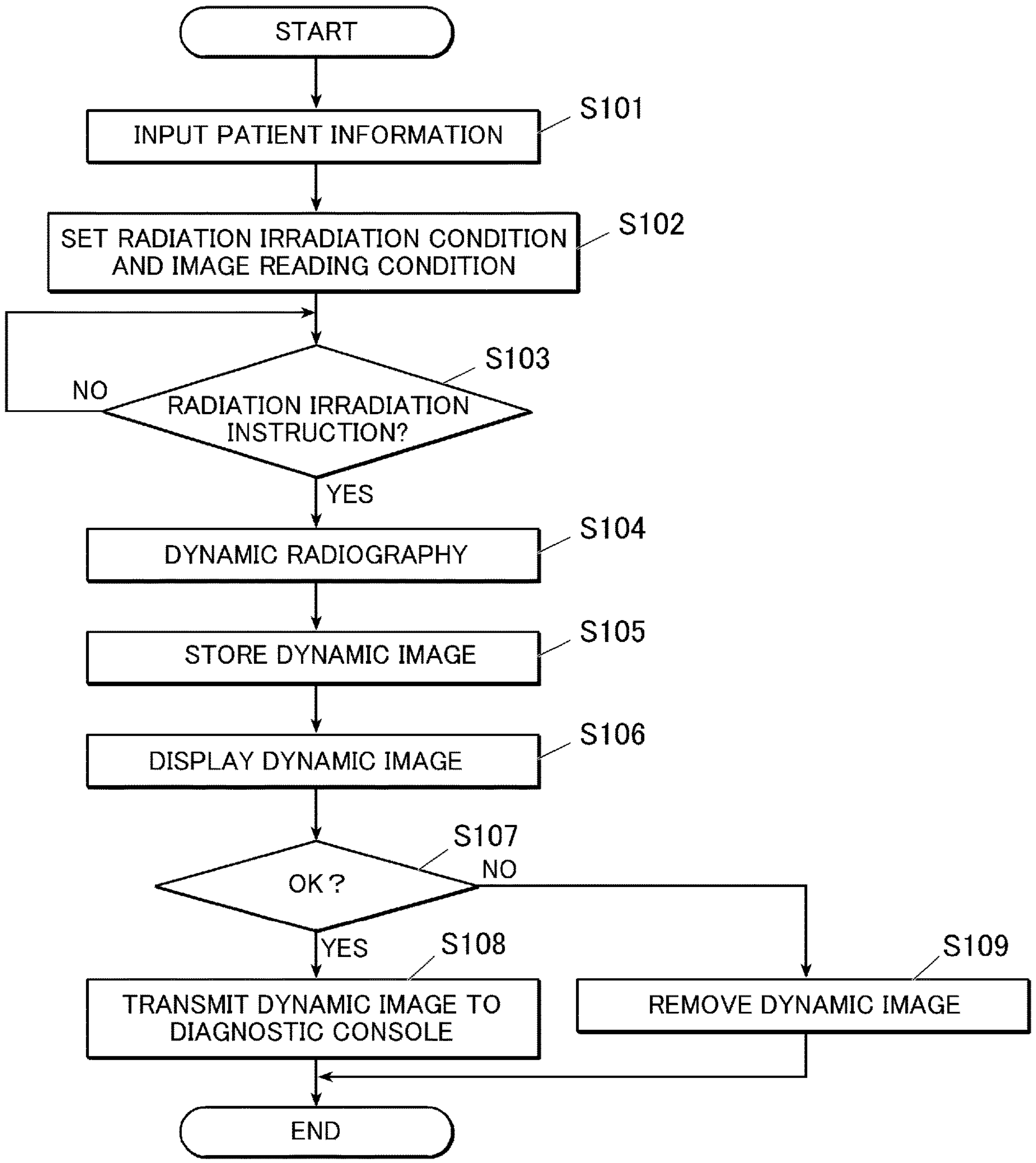
FIG. 2 is a flowchart of a radiographing control process.

Next, the operation of the image analysis system 100 in this embodiment is described. First, a radiographing operation by the radiographing apparatus 1 and the radiographic console 2 are described. FIG. 2 shows a radiographing control process executed by the controller 21 of the radiographic console 2. The radiographing control process is executed by cooperation between the controller 21 and the program stored in the storage 22.

(Patient Information Input)

First, the operation receiver 23 of the radiographic console 2 is operated by a user. By this operation, patient information on the subject M, who is a test subject, and test information are input (Step S101).

(Setting of Radiation Irradiation Condition and Image Reading Condition)

Next, the radiation irradiation condition is read from the storage 22, and is set in the radiation irradiation control device 12. The image reading condition is read from the storage 22, and is set in the reading control device 14 (Step S102). Here, the frame rate is set so as to be shorter than the expiratory cycle. A typical frame rate of dynamic radiography is 15 fps. However, the expiratory cycle has a long period. Accordingly, the frame rate may be 7.5 fps, 3 fps, etc.

Next, an instruction for irradiation with radiation through an operation to the operation receiver 23 is waited (Step S103). Here, the radiography operator arranges and positions the subject M between the radiation source 11 and the radiation detector 13. The subject M is instructed in taking a respiration state. Specifically, the subject M is urged to breathe deeply. Alternatively, the subject M may be instructed to make quiet breathing or forced breathing. When the preparation for radiography is successfully made, the radiography operator operates the operation receiver 23, and inputs a radiation irradiation instruction.

(Dynamic Radiography)

If the radiography operator inputs the radiation irradiation instruction (Step S103: YES), a radiography start instruction is output to the radiation irradiation control device 12 and the reading control device 14, and dynamic radiography is started. (Step S104). That is, the radiation is emitted from the radiation source 11 at a pulse interval set in the radiation irradiation control device 12, and a frame image is obtained by the radiation detector 13.

A radiation irradiation finish instruction is input through the operation receiver 23, subsequently, an instruction for finishing radiography is output by the controller 21 to the radiation irradiation control device 12 and the reading control device 14, and the radiographing operation is stopped. The radiography operator issues the instruction for finishing irradiation with radiation so as to perform dynamic radiography at timing including at least an exhalation. This is because the stenoses of the trachea and bronchi occur in the middle of an exhalation.

(Dynamic Image Storing)

The frame images obtained by radiography are sequentially input into the radiographic console 2, and stored in the storage 22 in association with the respective frame numbers indicating the radiographing order (Step S105). The frame image obtained by radiography is displayed on the display 24 (Step S106). The radiography operator verifies the positioning and the like based on the displayed dynamic image, and determines whether the radiography is allowed, i.e., OK, or is not allowed, i.e., NG (no-good). The radiography operator operates the operation receiver 23, and inputs a determination result.

(Dynamic Image Transmission)

If the radiography OK is input (Step S107; Yes), the controller 21 attaches identification information on the dynamic image to each of the series of frame images obtained through the dynamic radiography. The identification information includes, for example, identification ID, patient information, test information, a radiation irradiation condition, an image reading condition, and a frame number. The controller 21 transmits image data in which the identification information is written in a header region in, for example, the DICOM format, to the diagnostic console 3 via the communicator 25 (Step S108). After the attachment of the identification information to each frame image, and the transmission to the diagnostic console 3, this process is finished.

(Dynamic Image Removal)

On the other hand, if the radiography NG is input (Step S107: No), the controller 21 removes the series of frame images stored in the storage 22 (Step S109), this process is finished. In this case, radiography is required to be made again.

According to this embodiment, in the radiographing control process described above, front chest and/or side chest dynamic radiography is performed. The front chest and/or side chest dynamic images are then obtained by the dynamic radiography.

[Stenosed State Estimation Process]

Figure 3:
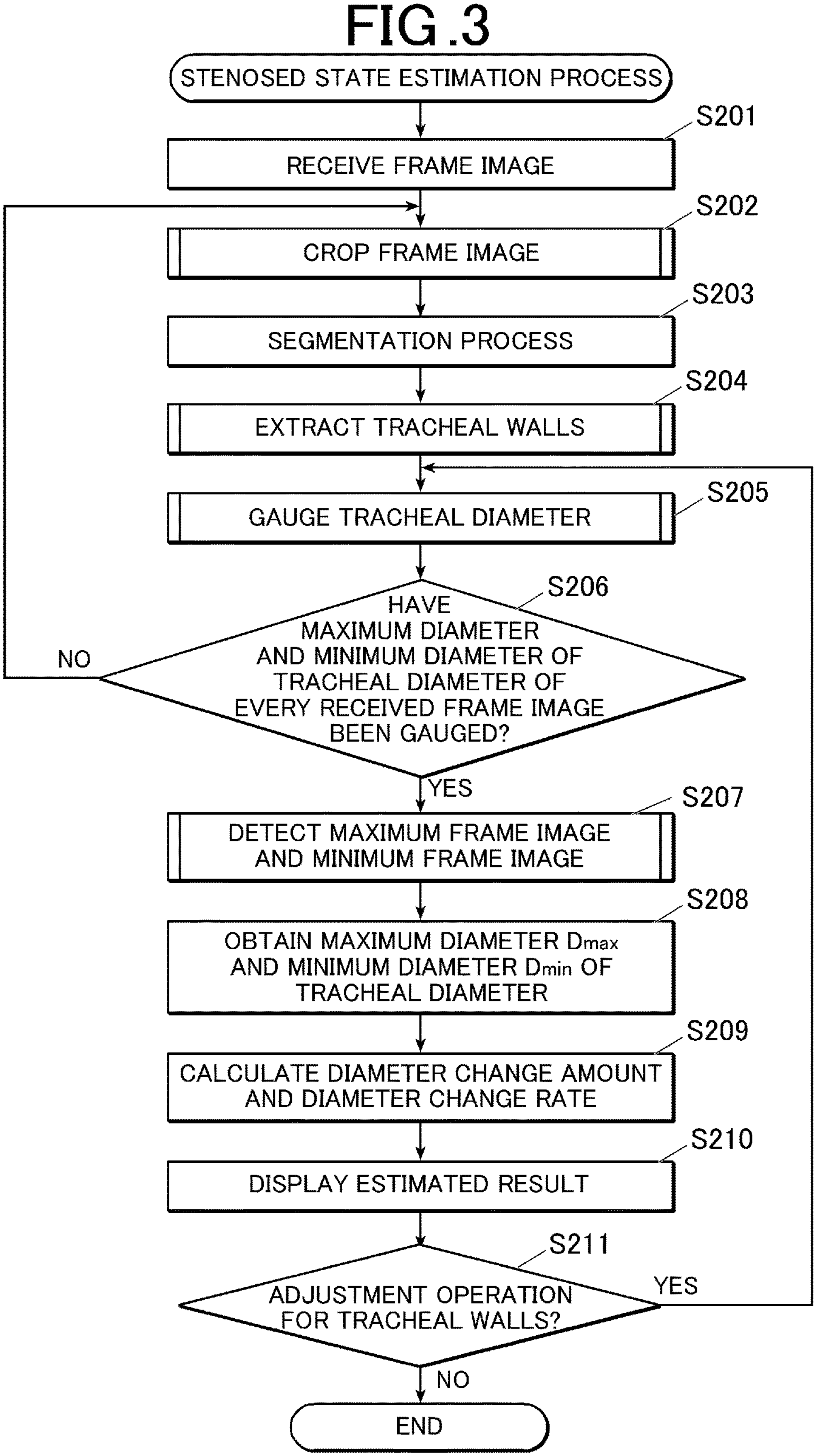
FIG. 3 is a flowchart of a stenosed state estimation process.

Next, the stenosed state estimation process by the diagnostic console 3 is described with reference to FIG. 3.

(Dynamic Image Reception)

First, the controller 31 receives, via the communicator 35, the series of frame images of the chest dynamic image radiographed by the radiographic console 2 (Step S201).

(Frame Image Cropping)

Before the controller 31 extracts the intrathoracic tracheal region, the controller 31 crops the received frame image (Step S202). In a dynamic image with a low dose, edges on the tracheal walls are blurred. Accordingly, it is intended that an input image into deep learning for performing a segmentation process should maintain high resolution. However, as the image size is large, the processing time period increases. A range where the tracheal region is present is only part of a chest image. Accordingly, the processing time period can be reduced by cropping.

Figure 4:
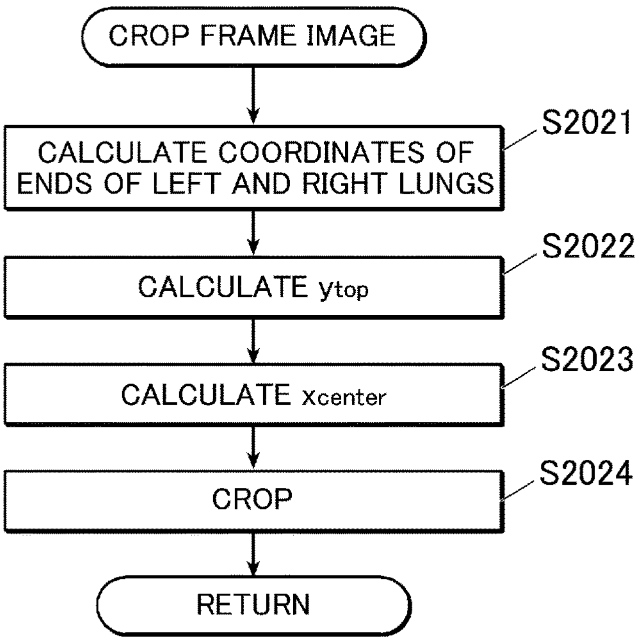
FIG. 4 is a flowchart of a frame image cropping process.
Figure 5:
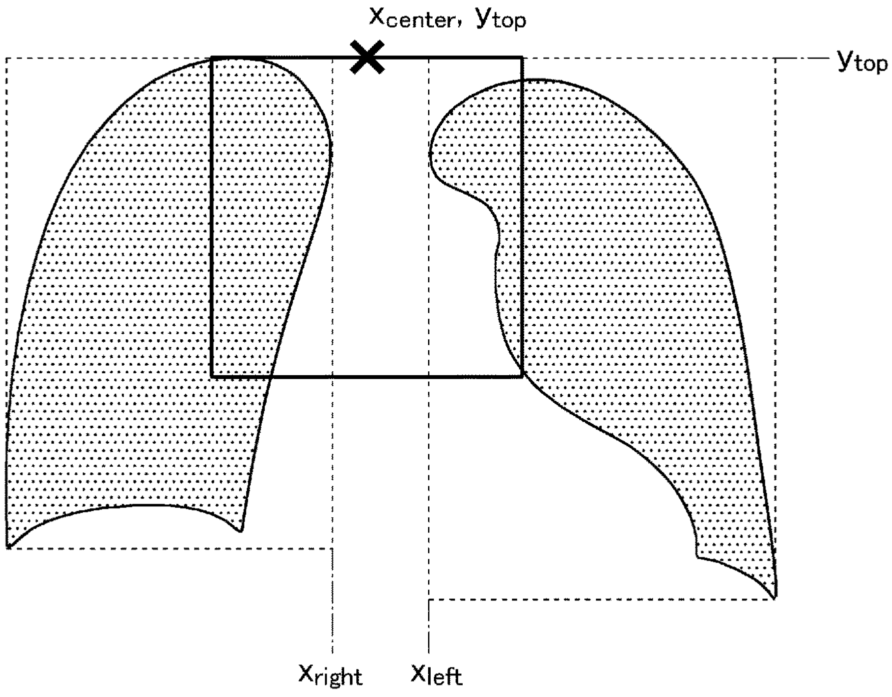
FIG. 5 shows an example of the cropping process.

The frame image cropping is described with reference to FIGS. 4 and 5. Anatomical landmarks, such as the lungs, thorax, mediastinum, and collarbones, may be detected to determine cropping positions, which may be determined using position information on a lung field mask separately recognized using machine learning or the like. Specifically, the controller 31 obtains a circumscribed rectangle for each of left and right lungs, and the coordinates of four points constituting the corresponding circumscribed rectangle (Step S2021). The controller 31 obtains the y-coordinate $y_{top}$ of one of the left and right lungs that has a higher top end position, and adopts the coordinate as the reference of the top end position of the cropping region (Step S2022). Thus, the extrathoracic region can be regarded as a region out of the cropping region. The controller 31 obtains $X_{center}$ that represents the x-directional center coordinate of the cropping region, based on the x-coordinate $X_{right}$ at the right end of the circumscribed rectangle of the right lung, and the x-coordinate $X_{left}$ at the left end of the circumscribed rectangle of the left lung (Step S2023). The method of obtaining $X_{center}$ is based on the following (Expression 1). Note that in (Expression 1), α is a fixed value; it is desirable that α be 0.5 or more because the trachea tends to be shifted to the right lung.

$$x_{center} = \alpha \cdot x_{right} + (1.0 - \alpha) \cdot x_{left} \quad \text{(Expression 1)}$$

After calculation of $y_{top}$ and $X_{center}$, the controller 31 determines the cropping region, with the coordinates ($X_{center}$, $y_{top}$) being assumed as the center top end, and crops the frame image (Step S2024). The vertical size and the lateral size of the cropping region may be fixed values, or variable values proportional to the size of the lung field mask, or the like.

By cropping the frame image, the resolution is maintained when an image is input into the deep learning in Step S203 described later, the loads of various processes are reduced. Note that the controller 31 may extract the intrathoracic tracheal region without cropping.

Figure 6:
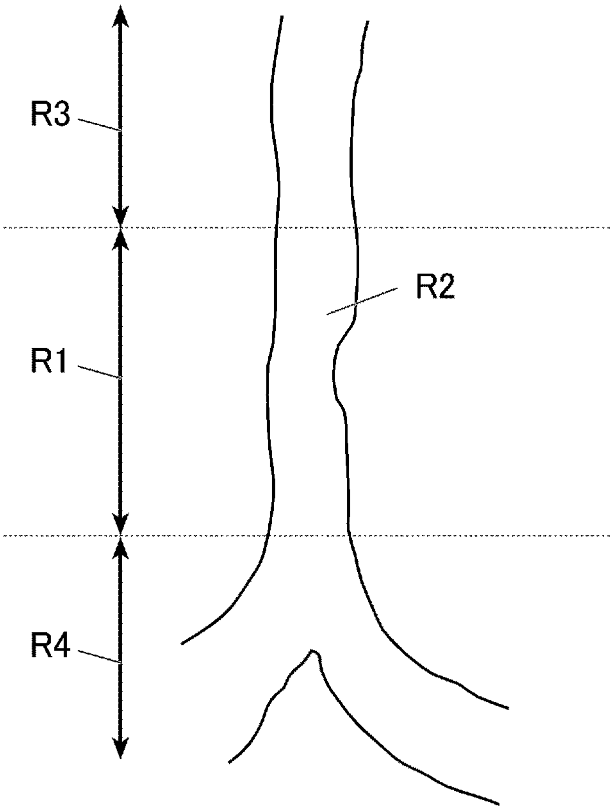
FIG. 6 shows an intrathoracic region, an intrathoracic tracheal region, an extrathoracic region, and a bronchial region.

Note that in the following description, as shown in FIG. 6, a region R1 obtained by removing a bronchial region R4 from the intrathoracic region is assumed as an "intrathoracic region R1", and the tracheal region in the intrathoracic region R1 is assumed as an "intrathoracic tracheal region R2". A region R3 upward of the intrathoracic region R1 is an extrathoracic region R3.

(Segmentation Process)

After the frame image is cropped, the controller 31 directly extracts the intrathoracic tracheal region R2 or the tracheal walls W in the segmentation process. That is, the intrathoracic region R1, and the tracheal region or the tracheal walls are simultaneously extracted, and their overlapping region is regarded as the intrathoracic region R2 or the tracheal walls W (Step S203). In the segmentation process, using deep learning, a model is learned in which the intrathoracic tracheal region R2 or the tracheal walls W are preliminarily assumed as a ground-truth image, thus allowing inference to be achieved. By the simultaneous extraction, advantageous effects of simplifying the processing configuration and improving the processing speed are exerted.

To create the ground-truth image, for example, the sternoclavicular joint, top end of superior sulcus, thoracic rib, or the like is assumed as the top end of the intrathoracic tracheal region R2 or the tracheal walls W. A portion upward of a bronchial bifurcation point by one vertebral body, a portion of the tracheal walls W bulging by bifurcation, or the like is assumed as the bottom end of the intrathoracic tracheal region R2 or the tracheal walls W. Accordingly, only the intrathoracic region is extracted as the intrathoracic tracheal region R2 or the tracheal walls W, and the controller 31 can highly accurately estimate the stenosed state of the trachea and bronchi. Since the intrathoracic tracheal region R2 or the tracheal walls W do not include the bronchial region R4, the stenosed state of the trachea can be highly accurately estimated in a range of not causing a confusion of the definition of the method of gauging the tracheal diameter r, the diameter change rate of the tracheal diameter r, or the like due to bifurcation.

In a case where the simultaneous extraction is not performed, a deep learning model of the intrathoracic tracheal region R2 or the tracheal walls W is learned using ground-truth images that include the extrathoracic region R3 and the bronchial region R4. The tracheal region obtained by inferring the deep learning model is limited to the inside of the intrathoracic region R1 that is a gauging range by another scheme, thereby identifying the intrathoracic tracheal region R2 or the tracheal walls W. That is, the gauging range is the intrathoracic region R1.

Landmark detection or the like may be used as the scheme for detecting the gauging range. In Step S203, the controller 31 detects, for example, the sternoclavicular joint, the top end of the superior sulcus, the thoracic rib, or the like, as the top end of the intrathoracic region R1. The controller 31 further detects, for example, the portion upward of a bronchial bifurcation point by one vertebral body, the portion of the tracheal walls W bulging by bifurcation, or the like, as the top end position of the bronchial region R4. Accordingly, only the intrathoracic region is extracted as the intrathoracic tracheal region R1, and the controller 31 can highly accurately estimate the stenosed state of the trachea and bronchi.

Preferably, the deep learning model of the controller 31 is learned in a multitask manner so as to perform two segmentation outputs of the intrathoracic tracheal region R2 and the top end of the bronchial region R4. According to this configuration, recognition of the top end of the bronchial region R4 can be weighted, which can improve the accuracy of the simultaneous extraction. In this simultaneous extraction, the radius of receptive field of each pixel in the deep learning is configured to be the distance between from the trachea pixels around the top and bottom boundaries of the gauging range to the top and bottom gauging range defining structural objects, or more. Here, the gauging range defining structural objects indicate the sternoclavicular joint and the bronchial bifurcation point. Such a wide receptive field can achieve simultaneous recognition of the tracheal walls W, and the vertical direction, which is the direction of the trachea.

(Tracheal Wall Extraction)

Figure 7:
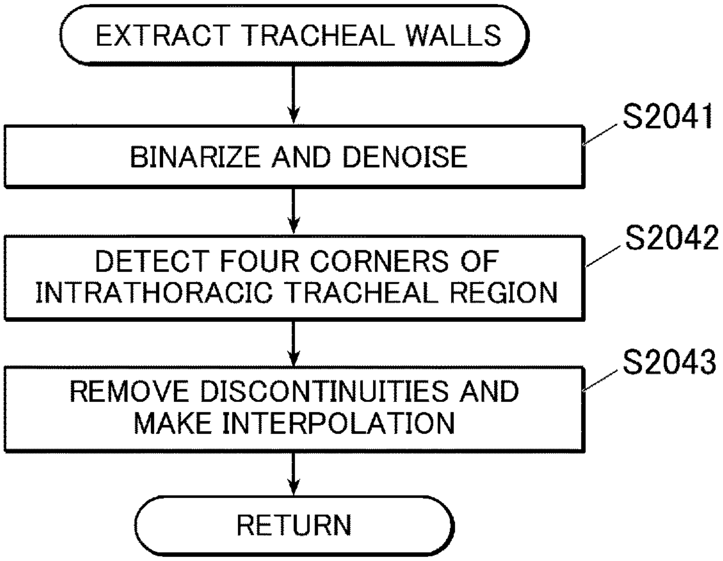
FIG. 7 is a flowchart of a tracheal wall extraction process.
Figure 8A:
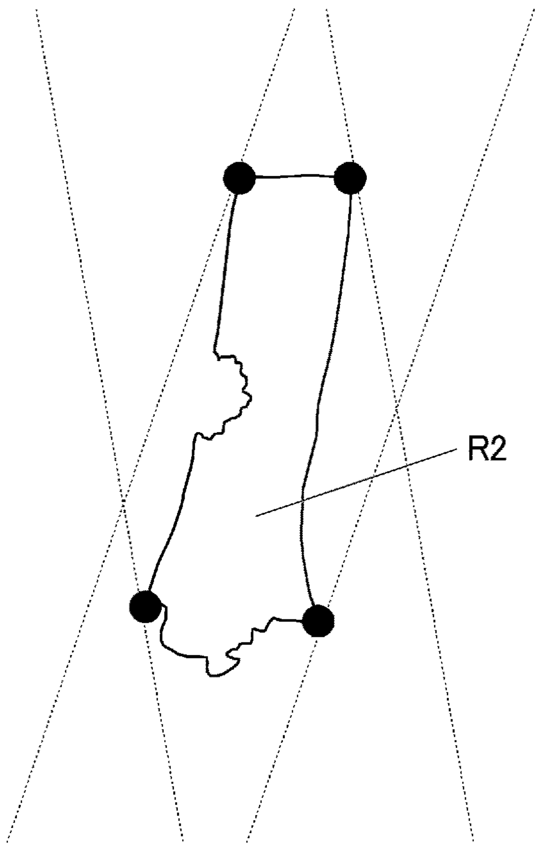
FIG. 8A shows a process of detecting four points of the tracheal region.
Figure 8B:
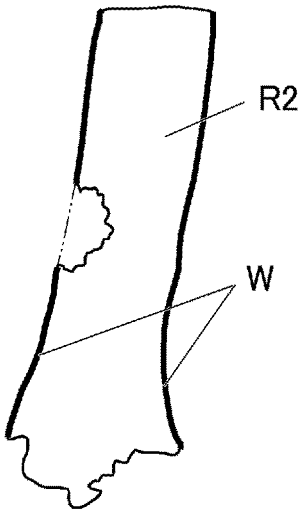
FIG. 8B shows the interpolated tracheal region.
Figure 9:
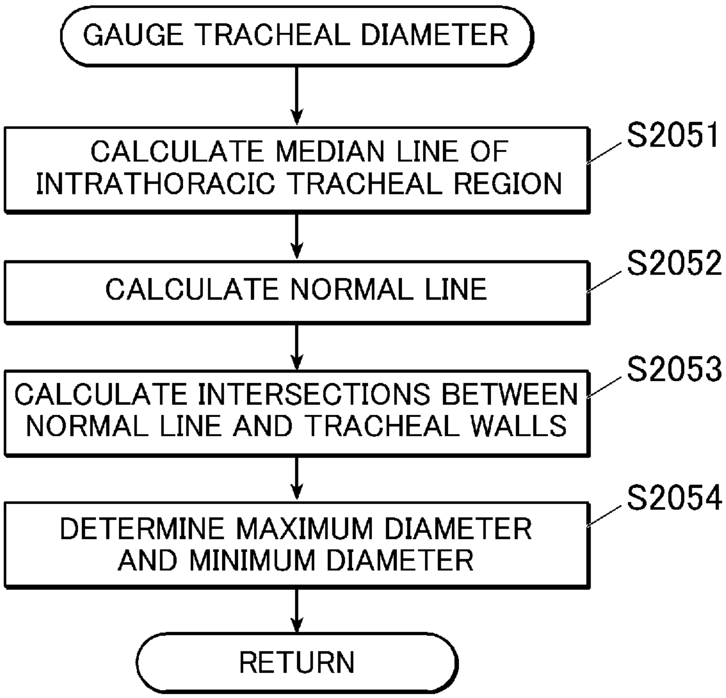
FIG. 9 is a flowchart of a tracheal diameter gauging process.

The controller 31 extracts the left and right tracheal walls W from the intrathoracic tracheal region R2 (Step S204). Extraction of the tracheal walls is described with reference to FIGS. 7, 8A, and 8B. The controller 31 binarizes and denoises the inference result of the intrathoracic tracheal region R2 (Step S2041). As shown in FIG. 8A, the controller 31 detects points at four corners, or top left, top right, bottom left, and bottom right, of the intrathoracic tracheal region R2 (Step S2042). The controller 31 then assumes, as the tracheal walls W, a point sequence from the bottom left point to the top left point on the contour of the intrathoracic tracheal region R2, and a point sequence from the bottom right point to the top right point on the contour of the intrathoracic tracheal region R2.

The segmentation process of the deep learning causes detection failure or over-detection. Accordingly, correction may be made in a post-process. In identification of the left tracheal wall W from the top left to the bottom left, the controller 31 detects, as a discontinuity, a point at which the inclination of the tracheal wall W largely varies, and detects the discontinuity in the opposite direction from the bottom left to the top left in a similar manner. The controller 31 then connects two discontinuities with a line or the like, thus achieving the left tracheal wall W where detection failure and over-detection are corrected (Step S2043). This similarly applies to the right tracheal wall W.

Note that the top end and the bottom end of the tracheal walls W may be determined based on the respective top end positions and the bottom end positions of the left and right tracheal walls W. Preferably, a shorter one between the left and right tracheal walls is adopted.

The controller 31 may directly estimate the tracheal wall region in the deep learning in Step S203. Specifically, after estimation of the tracheal wall region, the controller 31 detects the points at the four corners, or top left, top right, bottom left, and bottom right, of the tracheal wall region. The controller 31 then assumes, as the tracheal walls W, a point sequence from the bottom left point to the top left point on the contour of the tracheal wall region, and a point sequence from the bottom right point to the top right point on the contour of the tracheal wall region.

(Tracheal Diameter Gauging)

The controller 31 gauges the maximum diameter and the minimum diameter of the tracheal diameter r in the intrathoracic tracheal region R2 in each frame image (Step S205). Gauging of the maximum diameter and the minimum diameter of the tracheal diameter r in the intrathoracic tracheal region R2 in one frame image is described with reference to FIGS. 9 and 10A to 10C.

Conventionally, a method of estimating a tracheal stenosis with multiple-time-phase CT images calculated the area of the intrathoracic tracheal region R2 on the axial section, which is one CT image scanning direction, at multiple time phases, and estimated the tracheal stenosis based on the area change rate. Also with the dynamic image, there was a conventional study obtaining the tracheal diameter by gauging the distance between the left and right tracheal walls in the X-direction, assuming that the craniocaudal direction of a human body was the Y-direction of the dynamic image. Unfortunately, in actuality, the trachea was not straight on the craniocaudal direction of the human body, and was curved. Accordingly, the original tracheal diameter could not be accurately gauged, and the accuracy of estimating the tracheal stenosis was degraded.

Figure 10A:
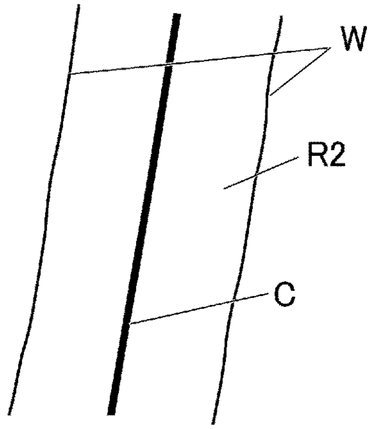
FIG. 10A shows the median line of the trachea.
Figure 10B:
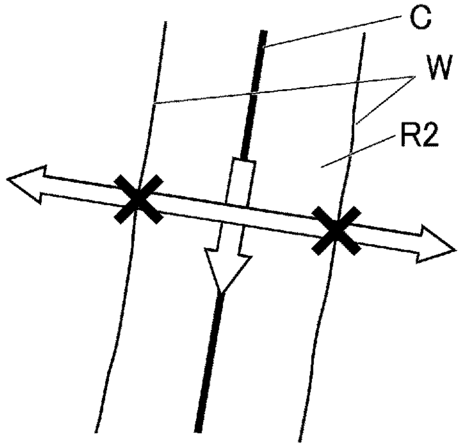
FIG. 10B shows the normal line of the trachea, and the intersections between the normal line and the tracheal walls.

To solve the degradation, the disclosed method identifies the longitudinal direction of the trachea, calculates the intersections with the left and right tracheal walls W in the normal line of the longitudinal direction, and calculates the distance between the intersections as the tracheal diameter r. Specifically, as shown in FIG. 10A, the controller 31 calculates, for example, the midpoint as the representative point of the left and right tracheal walls W at each y-coordinate, and obtains the median line C of the intrathoracic tracheal region R2 as the representative line (Step S2051). After calculation of the median line C, as shown in FIG. 10B, the controller 31 obtains the slope at each point on the median line C, and obtains the normal line of the slope (Step S2052). The controller 31 then obtains the intersections between the normal line and the left and right tracheal walls W, and assumes, as the tracheal diameter r, a line segment connecting the intersections between the normal line and the left and right tracheal walls W (Step S2053).

Figure 10C:
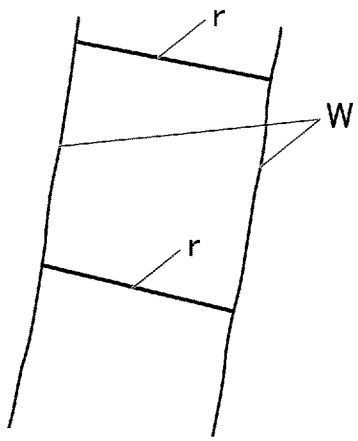
FIG. 10C shows the maximum diameter and the minimum diameter of the trachea.

The controller 31 determines the maximum diameter and the minimum diameter of the tracheal diameter r of the tracheal region R2 as shown in FIG. 10C, from such multiple tracheal diameters r (Step S2054).

The controller 31 determines whether the maximum diameter and the minimum diameter of the tracheal diameter r in the intrathoracic tracheal region R2 have been gauged in every frame image (Step S206). If the maximum diameter and the minimum diameter of the tracheal diameter r in the intrathoracic tracheal region R2 have not been gauged yet in every frame image (Step S206; No), the controller 31 causes the processing to transition to Step S202. The controller 31 then gauges the maximum diameter and the minimum diameter of the tracheal diameter r in the intrathoracic tracheal region R2 in another frame image.

(Frame Image Detection)

After the maximum diameter and the minimum diameter of the tracheal diameter r in the intrathoracic tracheal region R2 have been gauged in every frame image (Step S206; Yes), the controller 31 detects the frame image to be used to estimate the stenosed state (Step S207).

Figure 11:
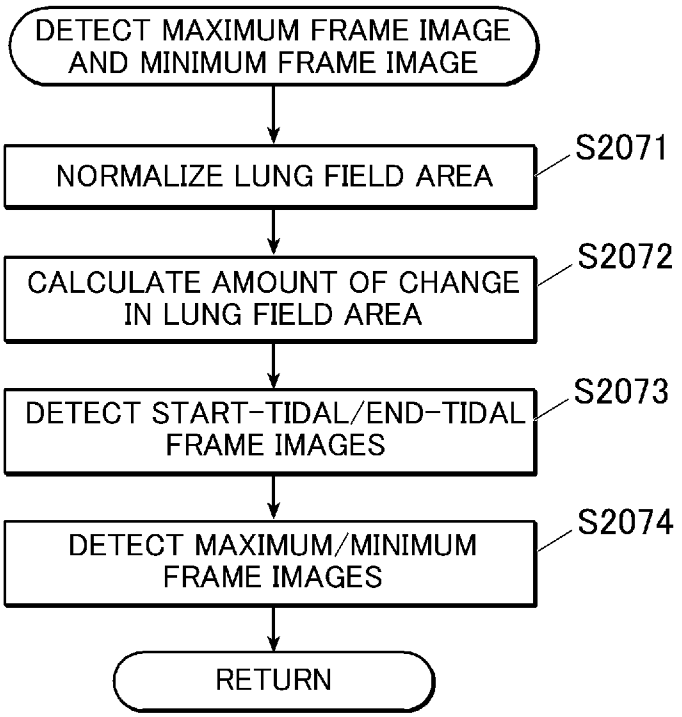
FIG. 11 is a flowchart showing an expiratory frame image detection process.

Detection of the frame image to be used to estimate the stenosed state is described with reference to FIG. 11. The controller 31 normalizes the lung field area of each frame image in a range from 0.0 to 1.0 (Step S2071). The controller 31 then calculates the amount of change in lung field area in each frame image (Step S2072). The controller 31 then detects a start-tidal frame image that is a frame image at the start of exhalation through a threshold process. The controller 31 further detects an end-tidal frame image at the end of exhalation through a threshold process (Step S2073). Note that in the following description, the start-tidal frame image and the end-tidal frame image are collectively called expiratory frame images.

Specifically, the controller 31 performs a search in the temporal forward direction, and detects the first frame image having a lung field area equal to or less than a predetermined threshold, as the end-tidal frame image. For the detection of the end-tidal frame image, the predetermined threshold for the lung field area is, for example, 0.3. The controller 31 performs a search in the temporal reverse direction from the end-tidal frame image, and detects the first frame image having a lung field area equal to or more than a predetermined threshold, as the start-tidal frame image. For the detection of the start-tidal frame image, the predetermined threshold for the lung field area is, for example, 0.7. As to the detection order of the expiratory frame images, any order may be adopted. The expiratory frame image may be detected based on whether or not the amount of change in lung field area falls within the threshold and approaches a flat state.

The start-tidal level is the inspiratory level, and the lung tissue is enlarged and sparse. Accordingly, the lung field region has high pixel values. The end-tidal level is the expiratory level, and the lung tissue is shrunk and dense. Accordingly, the lung field region has low pixel values. Accordingly, the expiratory frame image may be detected based on the pixel values of the lung field.

The start-tidal level is the inspiratory level, and the diaphragm is positioned relatively low. The end-tidal level is the expiratory level, and the diaphragm is positioned relatively high. Accordingly, the expiratory frame image may be detected based on the position of the diaphragm.

The controller 31 detects a maximum frame image that is a frame image having the largest maximum diameter of the tracheal diameter r in the intrathoracic tracheal region R2, from among frame images around the start-tidal frame image. The controller 31 detects a minimum frame image that is a frame image having the smallest minimum diameter of the tracheal diameter r in the intrathoracic tracheal region R2, from among frame images around the end-tidal frame image (Step S2074). This is because the intrathoracic tracheal region R2 is most expanded at the start-tidal level. This is also because the stenosis of the intrathoracic tracheal region R2 occurs at the end-tidal level. Note that "frame images around the expiratory frame image" indicate, for example, frame images radiographed within one second from the expiratory frame image.

(Obtainment of Maximum Diameter and Minimum Diameter of Tracheal Diameter, and Calculation of Diameter Change Amount and Diameter Change Rate)

After detection of the maximum frame image and the minimum frame image, the controller 31 obtains the maximum diameter Dmax of the tracheal diameter r in the intrathoracic tracheal region R2, from the maximum frame image. The controller 31 also obtains the minimum diameter Dmin of the tracheal diameter r in the intrathoracic tracheal region R2, from the minimum frame image (Step S208). The controller 31 then calculates the diameter change amount and the diameter change rate, based on Dmax and Dmin (Step S209). Note that the diameter change rate can be calculated by (Expression 2).

$$\text{diameter change rate} = \{(D\max - D\min)/D\max\} \times 100[\%] \quad \text{(Expression 2)}$$

(Estimated Result Displaying)

Figure 12:
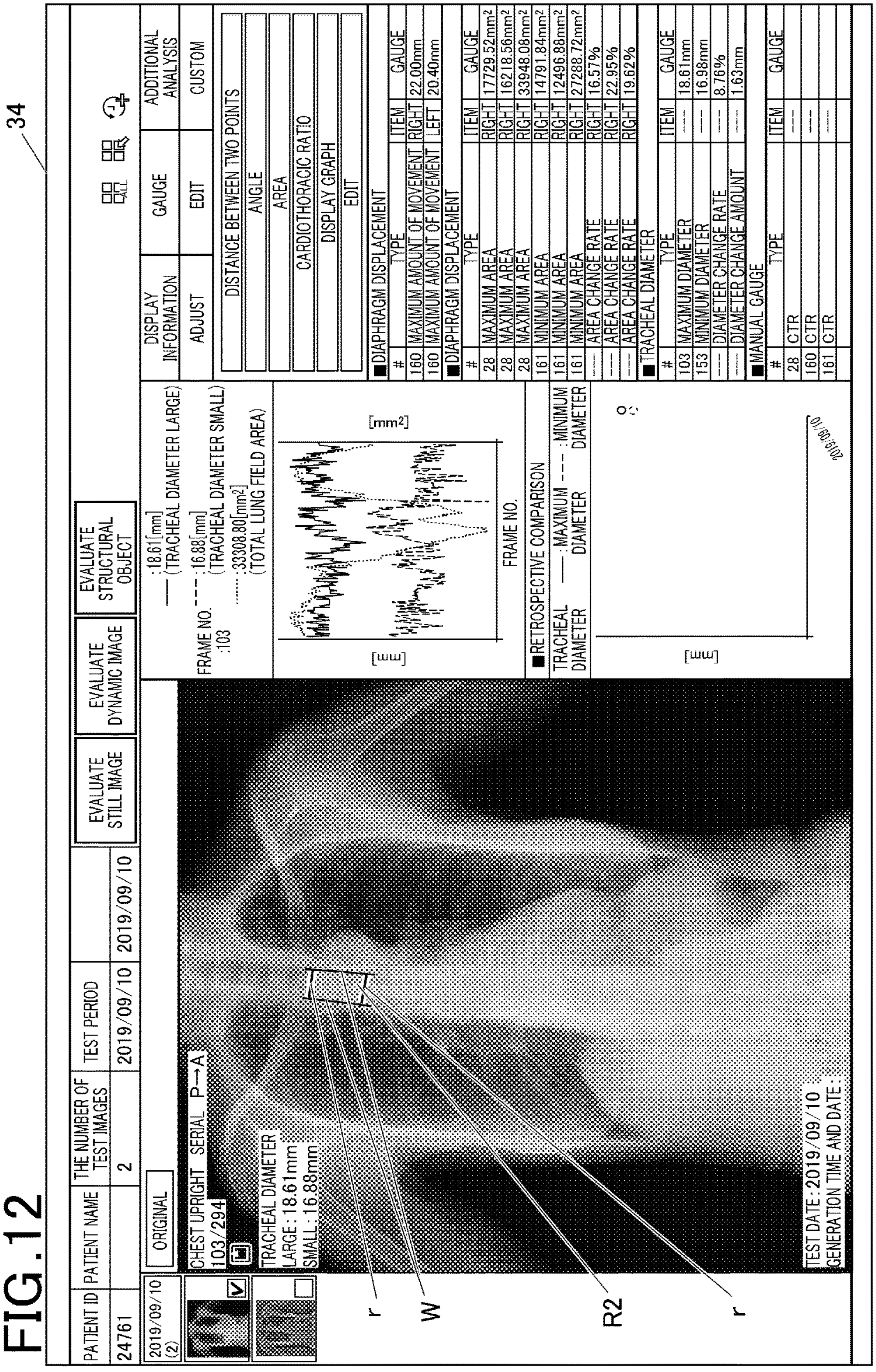
FIG. 12 shows a display on which an estimated result is displayed.

The controller 31 displays an estimated result on the display 34 (Step S210). FIG. 12 shows an example of the display 34 on which the estimated result is displayed. As shown in FIG. 12, the left and right tracheal walls W in one frame image, the maximum diameter and the minimum diameter of the tracheal diameter r in the intrathoracic tracheal region R2, and their values are displayed on the display 34.

If the diameter change rate is equal to or higher than a predetermined threshold, the controller 31 determines that the intrathoracic tracheal region R2 is in the stenosed state. On the other hand, if the diameter change rate is less than the predetermined threshold, the controller 31 determines that the intrathoracic tracheal region R2 is not in the stenosed state.

According to typical diagnosis, in a case where the sectional area of the trachea or the bronchi is changed by 50% or more, the state is determined to be the stenosed state. If it is assumed that the section of the trachea or each bronchus is a precise circle, the sectional area of the trachea or each bronchus is "radius×radius×π". Accordingly, it is preferable the predetermined threshold be 29.3%.

Note that display content on the display 34 is not limited to the left and right tracheal walls W in one frame image, the maximum diameter and the minimum diameter of the tracheal diameter r in the intrathoracic tracheal region R2, and their values. As shown in FIG. 12, a graph may be displayed where the abscissa axis indicates the frame number, and on the ordinate axis, the maximum diameter and the minimum diameter of the tracheal diameter r in the intrathoracic tracheal region R2, and the lung field area in each frame image are plotted. A graph of test subjects having the same case histories where the abscissa axis indicates the gauging date, and on the ordinate axis, Dmax and Dmin are plotted may be displayed. Alternatively, the mean or variance of the tracheal diameter r in the intrathoracic tracheal region R2 in each frame image may be calculated, and displayed as a graph.

For the tracheal walls W, the extrathoracic tracheal walls W and bronchi or therearound may be displayed, and the gauging range may be indicated by a line segment in the X-direction. By displaying the top end of the gauging range with a line, the positional relationship with the sternoclavicular joint, thoracic rib, superior sulcus, and vertebral body, which are landmarks indicating the intrathoracic region, can be visually identified. By displaying the bottom end of the gauging range with a line, the positional relationship with the portion upward of a bronchial bifurcation point by one vertebral body, or the portion of the tracheal walls bulging by bifurcation can be visually identified. In a case where a bronchial bifurcation point is detected, it is preferable that the detected point of the bronchial bifurcation point also be displayed.

For displaying the estimated result on the display 34, it is preferable to display the tracheal walls W and the tracheal diameter r with different colors in order to improve the discrimination of the left and right tracheal walls W, and the tracheal diameter r (the maximum diameter, and the minimum diameter). For displaying the estimated result on the display 34, it is preferable to display the line of the tracheal diameter r with different colors in accordance with estimation of the stenosed state. According to this configuration, identification can be achieved at a glance based on the color of line on the image without reference to numerical values.

(Adjustment Operation of Tracheal Walls)

As described above, the left and right tracheal walls W are displayed on the display 34. Here, the controller 31 accepts an adjustment operation for the extracted content of the tracheal walls W through an operation by the user (Step S211).

If the user has not performed the adjustment operation for the tracheal walls W (Step S211; No), the controller 31 finishes the stenosed state estimation process. If the user has performed the adjustment operation for the tracheal walls W (Step S211; Yes), the processing transitions to Step S205, and the controller 31 regauges the tracheal diameter r and the maximum diameter and the minimum diameter of the tracheal diameter r from all the frame images having been subjected to the adjustment operation, using the adjusted tracheal walls W. Based on the regauged result, the maximum frame image, the minimum frame image, the maximum diameter Dmax, the minimum diameter Dmin, the diameter change rate, and the diameter change amount are also recalculated.

Furthermore, it is preferable that the maximum frame image and the minimum frame image can be set by the user through the operation receiver 33. In case automatic extraction fails, manual adjustment of the tracheal walls W in multiple frames is significantly troublesome. Accordingly, the user identifies the maximum frame image and the minimum frame image, and the controller 31 adjusts only the tracheal walls W in two frame images, thus allowing recalculation of the maximum diameter Dmax and the minimum diameter Dmin. Alternatively, it is preferable that based on the tracheal walls W on one frame image adjusted by the user, the controller 31 re-extract the tracheal walls of all the frames through deep learning.

For the tracheal walls W, the tracheal walls in the extrathoracic region and bronchi and therearound may be displayed, and the gauging range may be indicated with a line segment in the x-direction, and the controller 31 may be capable of separately adjusting the tracheal walls and the gauging range, thus allowing indirectly adjusting the tracheal walls W.

Advantageous Effects of Invention

As described above, the diagnostic console 3, which is the image analysis apparatus according to this embodiment, includes the controller 31 serving as the receiver that receives a plurality of frame images including the trachea and bronchi. The diagnostic console 3 includes the controller 31 serving as the setter that sets the inside of the chest cavity as the intrathoracic region R1 in each of multiple frame images. The diagnostic console 3 includes the controller 31 serving as the extractor that extracts the tracheal walls W from each of the frame images. The diagnostic console 3 includes the controller 31 serving as the gauge that gauges the tracheal diameter r from the tracheal walls W.

According to this configuration, the inside of the chest cavity is assumed as the intrathoracic region R1, and the tracheal diameter r is gauged, thus allowing highly accurate estimation of whether the trachea and bronchi are in the stenosed state or not.

[Other Configurations]

The description in the above embodiment is a preferable example of the present invention, which is not limited thereto. For example, according to the embodiment described above, the controller 31 estimates the stenosed states of the trachea and bronchi, using the dynamic image in the front and/or side radiographic directions. However, there is no limitation to this. The controller 31 may estimate the stenosed state additionally using a dynamic image in an oblique direction. According to this configuration, the controller 31 can perform estimation, based on more information, such as on irregular shrinkage. Consequently, the estimation of the stenosed state can be more highly accurate.

In the above description, the case is exemplified where the diagnostic console 3 determines whether the state is in the stenosed state or not based on the diameter change rate. However, there is no limitation to this. It may be estimated whether the state is the stenosed state or not by causing the controller 31 to function as a measurement instrument that measures the temporal change in density of the intrathoracic tracheal region R2. In this configuration, the controller 31 may measure, as the density, a signal value of a pixel at a predetermined position, such as the center or the like of the intrathoracic tracheal region R2. Alternatively, the controller 31 may measure a representative value, such as the mean, median, maximum, or minimum, of the signal value of the pixel in the intrathoracic tracheal region R2, as the density.

For example, if the density in the intrathoracic tracheal region R2 increases in the front dynamic image, the controller 31 can estimate that it is saber-sheath-type tracheobronchomalacia. If the density in the intrathoracic tracheal region R2 increases in the side dynamic image, the controller 31 can estimate that it is crescent-type tracheobronchomalacia. If the density in the intrathoracic tracheal region R2 decreases only in the front dynamic image, the controller 31 can estimate that it is dynamic airway collapse where tracheal muscle is contracted. If the density in the intrathoracic tracheal region R2 decreases in both the front dynamic image and the side dynamic image, the controller 31 can estimate that it is circumferential-type tracheobronchomalacia.

According to the above description, if the user performs an adjustment operation for the tracheal walls W in Step S211, the controller 31 regauges the tracheal diameter r of every frame image. However, there is no limitation to this. That is, the controller 31 may regauge the tracheal diameter r only in frame images having been subjected to the adjustment operation.

According to the above description, the image received by the diagnostic console 3 is the dynamic image of the chest. However, there is no limitation to this. The image received by the diagnostic console 3 is only required to be a dynamic image where the subject M including the trachea and bronchi has been radiographed, and is not specifically limited. The image received by the diagnostic console 3 may be a plurality of still images obtained by continuously radiographing the subject M including the trachea and bronchi at a time interval shorter than the expiratory cycle.

Figure 13:
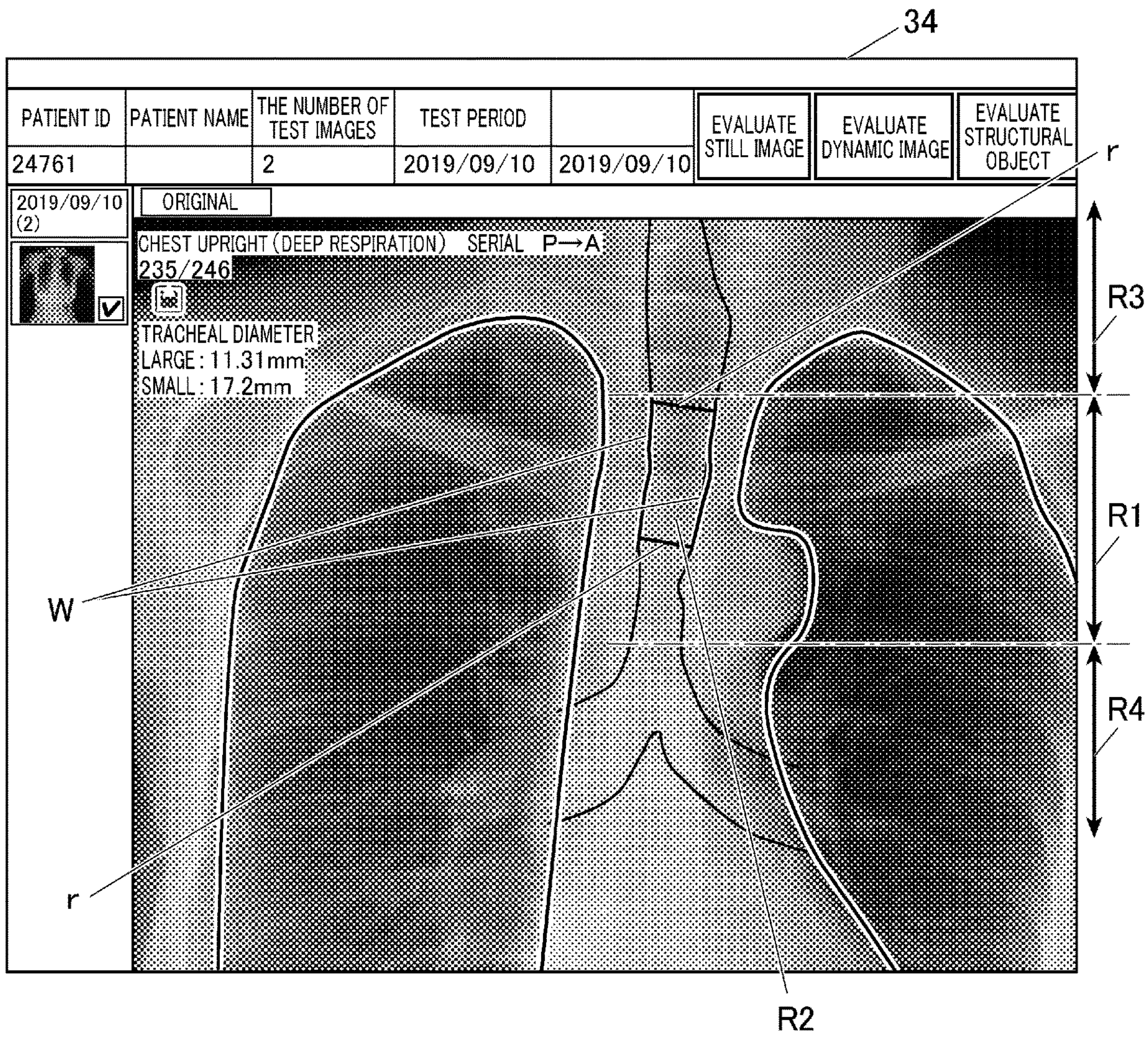
FIG. 13 shows a display according to another example.

According to the above description, the tracheal walls W in the intrathoracic region R1 are extracted. However, there is no limitation to this. That is, as shown in FIG. 13, the extrathoracic tracheal walls W may be separately extracted, and displayed together with the intrathoracic tracheal walls W on the display 34. At this time, both the range of the intrathoracic region R1, and the tracheal walls W including both extrathoracic and intrathoracic regions may be allowed to be adjusted and operated.

A plurality of frame images may be positionally aligned with respect to vocal cords and bronchial bifurcations in the trachea, the tracheal diameter r may be obtained with respect to each image at the same position in the trachea, the maximum among all the frames and the minimum among all the frames of the tracheal diameter r may be obtained with respect to the trachea at each position, the diameter change rate and the diameter change amount may be obtained with respect to the trachea at each position, and the obtained items may be displayed on the display 34.

The above description discloses an example using the hard disk, the semiconductor nonvolatile memory or the like as a computer-readable medium for the program according to the present invention. However, there is no limitation to this. As another computer-readable medium, a portable recording medium, such as a CD-ROM, may be applied. A medium for providing data of the program according to the present invention via a communication line may be carrier waves.

Alternatively, the detailed configuration and detailed operation of the image analysis apparatus may also be appropriately modified in a scope without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-046702 filed on Mar. 23, 2023 is incorporated herein by reference in its entirety.

The invention claimed is:

1. An image analysis apparatus, comprising a hardware processor that:
- receives a dynamic image that includes a plurality of frame images taken by dynamically radiographing an expiratory state of a subject including a trachea;
- sets an inside of a chest cavity in each of the plurality of frame images, as an intrathoracic region;
- extracts tracheal walls from the plurality of frame images; and
- gauges a tracheal diameter from the tracheal walls in the intrathoracic region, wherein the hardware processor extracts representative points from the tracheal walls in a direction perpendicular to a craniocaudal direction of a human body, and gauges the tracheal diameter from a normal line of a slope at each of points constituting a representative line connecting the representative points in the craniocaudal direction of the human body, based on the representative line.

2. The image analysis apparatus according to claim 1, wherein the hardware processor sets the intrathoracic region, based on a structural object of a thorax.

3. The image analysis apparatus according to claim 2, wherein the structural object of the thorax is at least one of a sternoclavicular joint, a vertebral body, and a thoracic rib.

4. The image analysis apparatus according to claim 1,
- wherein the hardware processor sets a bronchial region, and
- the hardware processor gauges the tracheal diameter in a range except the bronchial region.

5. The image analysis apparatus according to claim 1, wherein the hardware processor causes a display to display a gauging result.

6. The image analysis apparatus according to claim 5, wherein the hardware processor causes the display to display, as the gauging result, at least any of graphs of a mean, a maximum, a minimum, and a variance of the tracheal diameter in the plurality of frame images, a maximum frame image and a minimum frame image, a diameter change amount and a diameter change rate of the tracheal diameter, or a maximum diameter and a minimum diameter of the tracheal diameter in the frame images.

7. The image analysis apparatus according to claim 1, wherein the hardware processor identifies the expiratory state of the subject, and the hardware processor selects the frame image where the tracheal diameter is gauged based on content identified by the hardware processor.

8. The image analysis apparatus according to claim 7, wherein the hardware processor identifies whether the frame image is a start-tidal frame image or an end-tidal frame image.

9. The image analysis apparatus according to claim 8, wherein the hardware processor identifies the expiratory state of the subject, based on at least any of an area or a pixel value of a lung field, or a position of a diaphragm.

10. The image analysis apparatus according to claim 1, wherein the hardware processor measures a temporal change in density in an intrathoracic tracheal region.

11. The image analysis apparatus according to claim 1, wherein each of the representative points is a midpoint of the tracheal walls on left and right.

12. The image analysis apparatus according to claim 1, wherein the hardware processor can adjust the tracheal walls, and the hardware processor regauges the tracheal diameter, based on adjustment of the tracheal walls by the hardware processor.

13. The image analysis apparatus according to claim 12, wherein the hardware processor sets a bronchial region, the hardware processor gauges the tracheal diameter in a range except the bronchial region, and the hardware processor can adjust the intrathoracic region and/or the bronchial region.

14. An image analysis system, comprising:

a radiographing apparatus that radiographs dynamics of a subject including a trachea, and obtains a dynamic image including a plurality of frame images; and the image analysis apparatus according to claim 1.

15. An image analysis method of an image analysis apparatus, the method comprising:

receiving a dynamic image that includes a plurality of frame images taken by dynamically radiographing an expiratory state of a subject including a trachea;

setting an inside of a chest cavity in each of the plurality of frame images, as an intrathoracic region;

extracting tracheal walls from the plurality of frame images; and gauging a tracheal diameter from the tracheal walls in the intrathoracic region by extracting representative points from the tracheal walls in a direction perpendicular to a craniocaudal direction of a human body, and gauging the tracheal diameter from a normal line of a slope at each of points constituting a representative line connecting the representative points in the craniocaudal direction of the human body, based on the representative line.

16. A non-transitory computer-readable recording medium storing a program for causing a computer of an image analysis apparatus to:

receive a dynamic image that includes a plurality of frame images taken by dynamically radiographing an expiratory state of a subject including a trachea;

set an inside of a chest cavity in each of the plurality of frame images, as an intrathoracic region;

extract tracheal walls from the plurality of frame images; and gauge a tracheal diameter from the tracheal walls in the intrathoracic region by extracting representative points from the tracheal walls in a direction perpendicular to a craniocaudal direction of a human body, and gauging the tracheal diameter from a normal line of a slope at each of points constituting a representative line connecting the representative points in the craniocaudal direction of the human body, based on the representative line.

* * * * *